United States Patent
Chapiewski et al.

(10) Patent No.: US 11,528,581 B2
(45) Date of Patent: *Dec. 13, 2022

(54) TRACKING DEVICE SEARCH PARTY MANAGEMENT

(71) Applicant: Tile, Inc., San Mateo, CA (US)

(72) Inventors: Guilherme Chapiewski, Cupertino, CA (US); Mayank Kumar, San Francisco, CA (US)

(73) Assignee: Tile, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/477,541

(22) Filed: Sep. 17, 2021

(65) Prior Publication Data

US 2022/0007135 A1    Jan. 6, 2022

Related U.S. Application Data

(63) Continuation of application No. 17/027,383, filed on Sep. 21, 2020, now Pat. No. 11,153,715, which is a
(Continued)

(51) Int. Cl.
*H04W 4/02* (2018.01)
*H04W 8/00* (2009.01)

(52) U.S. Cl.
CPC ............ *H04W 4/023* (2013.01); *H04W 8/005* (2013.01)

(58) Field of Classification Search
CPC ............................... H04W 4/023; H04W 8/005
See application file for complete search history.

(56) References Cited

U.S. PATENT DOCUMENTS

| 6,433,685 B1 * | 8/2002 | Struble | B60R 25/00 340/539.27 |
| 6,771,972 B2 * | 8/2004 | McDonnell | G01S 13/74 701/1 |

(Continued)

FOREIGN PATENT DOCUMENTS

KR   10-2004-0038019 A    5/2004

OTHER PUBLICATIONS

Perez, Sarah. "Tile, The Lost-Item Tracker With Millions In Crowdfunding, Was Worth The Wait". Retrieved from <https://techcrunch.com/2014/06/12/tile-the-lost-item-tracker-with-millions-in-crowdfunding-was-worth-the-wait/>. Originally published Jun. 2014. (Year: 2014).*

(Continued)

*Primary Examiner* — Nathan A Mitchell
(74) *Attorney, Agent, or Firm* — Fenwick & West LLP

(57) ABSTRACT

A lost tracking device associated with a tracking system can be located by leveraging one or more community members by inviting these members to join a search party. Search party criteria can be identified and candidate search party members can be selected and invited based on the search party criteria. When invited candidate search party members accept the invitations, they are added to the search party. A last known location of the tracking device can be provided to the search party members, and the search party can remain in effect until the lost tracking device is located. The location of the lost tracking device is provided to the tracking system, which forwards it to the owner of the lost tracking device. A reward can be provided by the owner of the lost tracking device to the tracking system, which releases the reward to the search party member that located the lost tracking device.

20 Claims, 8 Drawing Sheets

Related U.S. Application Data continuation of application No. 16/296,228, filed on Mar. 8, 2019, now Pat. No. 10,820,146, which is a continuation of application No. 15/852,307, filed on Dec. 22, 2017, now Pat. No. 10,271,168, which is a continuation of application No. 14/939,897, filed on Nov. 12, 2015, now Pat. No. 9,894,480.

(56) References Cited

U.S. PATENT DOCUMENTS

| | | | |
|---|---|---|---|
| 2002/0019238 A1* | 2/2002 | McDonnell | G01S 13/74 455/456.5 |
| 2004/0019609 A1 | 1/2004 | Orton et al. | |
| 2006/0187027 A1* | 8/2006 | Smith | G01C 21/20 701/532 |
| 2007/0033203 A1 | 2/2007 | Nemazi et al. | |
| 2007/0188320 A1* | 8/2007 | Smith | G01C 21/20 340/539.13 |
| 2008/0186162 A1 | 8/2008 | Rajan et al. | |
| 2009/0182587 A1* | 7/2009 | Lewis | H04W 4/029 701/515 |
| 2010/0262367 A1* | 10/2010 | Riggins | H04L 67/12 455/500 |
| 2012/0313756 A1 | 12/2012 | Page | |
| 2013/0162429 A1 | 6/2013 | Pfuhl | |
| 2013/0238410 A1 | 9/2013 | Fargo et al. | |
| 2014/0213301 A1* | 7/2014 | Evans | G06F 21/88 455/456.6 |
| 2014/0329460 A1* | 11/2014 | Loutit | G06Q 40/08 455/39 |
| 2015/0126233 A1* | 5/2015 | Burns | H04W 4/029 455/457 |
| 2016/0055175 A1* | 2/2016 | Thompson | G08B 21/0269 707/722 |
| 2016/0127862 A1* | 5/2016 | Beattie, Jr. | H04W 4/029 455/456.1 |
| 2017/0191843 A1* | 7/2017 | Yadav | H04W 4/12 |
| 2018/0227393 A1 | 8/2018 | Daub | |

OTHER PUBLICATIONS

Armstrong, M. "Where's the Remote? 5 Best Tracking Devices to Find Lost Items." Today.com, Jun. 30, 2014, 3 pages, [Online] [Retrieved Jun. 30, 2021], Retrieved from the Internet <URL:https://www.today.com/money/lost-found-5-best-tracking-devices-find-m-isplaced-items-1D79862951>.

Kientz, J. A. et al. "Where's My Stuff? Design and Evaluation of a Mobile System for Locating Lost Items for the Visually Impaired." Assets '06: Proceedings of the 8th International ACM SIGACCESS Conference on Computers and Accessibility, Oct. 2006, pp. 103-110.

Nickels, J. et al. "Find My Stuff: Supporting Physical Objects Search with Relative Positioning." UbiComp'13, Sep. 8-12, 2013, Zurich, Switzerland, pp. 325-334.

PCT International Search Report and Written Opinion, PCT Application No. PCT/US2016/058943, dated Feb. 8, 2017, 11 pages.

Saltzman, M. "This Tech Helps You Find Your Lost Stuff." USA Today, Oct. 2015, 3 pages, [Online] [Retrieved Jun. 30, 2021], Retrieved from the Internet <URL:https://www.usatoday.com/story/tech/columnist/saltzman/2015/10/10/tec-h-helps-you-find-your-lost-stuff/73591496/>.

United States Office Action, U.S. Appl. No. 14/939,897, dated Feb. 23, 2017, 9 pages.

United States Office Action, U.S. Appl. No. 15/852,307, dated Mar. 8, 2018, 17 pages.

United States Office Action, U.S. Appl. No. 15/852,307, dated Oct. 30, 2018, 7 pages.

United States Office Action, U.S. Appl. No. 16/296,228, dated Aug. 14, 2020, 11 pages.

Wang, T. et al. "Survey on Channel Reciprocity Based Key Establishment Techniques for Wireless Systems." Wireless Networks, vol. 21, Jan. 13, 2015, pp. 1835-1846.

United States Office Action, U.S. Appl. No. 17/027,383, dated Jul. 7, 2021, 13 pages.

* cited by examiner

TRACKING DEVICE SEARCH PARTY MANAGEMENT

CROSS REFERENCE TO RELATED APPLICATIONS

This application is a continuation of U.S. application Ser. No. 17/027,383, filed Sep. 21, 2020, now U.S. Pat. No. 11,153,715 which is a continuation of U.S. application Ser. No. 16/296,228, filed Mar. 8, 2019, now U.S. Pat. No. 10,820,146, which is a continuation of U.S. application Ser. No. 15/852,307, filed Dec. 22, 2017, now U.S. Pat. No. 10,271,168, which is a continuation of U.S. application Ser. No. 14/939,897, filed Nov. 12, 2015, now U.S. Pat. No. 9,894,480, all of which is incorporated herein by reference in their entirety.

BACKGROUND

This disclosure relates generally to locating a tracking device, and more specifically, to leveraging a network of users to locate a lost tracking device.

Electronic tracking devices have created numerous ways for people to track the locations of people and/or objects. For example, a user can use GPS technology to track a device remotely or determine a location of the user. In another example, a user can attach a tracking device to an important object, such as keys or a wallet, and use the features of the tracking device to more quickly locate the object, (e.g., if it becomes lost).

However, traditional tracking devices and corresponding systems suffer from one or more disadvantages. For instance, if a tracking device is lost, the limited wireless range of the tracking device prevents an owner of the tracking device from locating the tracking device from outside the range of the tracking device. Extending the wireless range of the tracking device requires additional power often unavailable in a low-power tracking device system. Accordingly, there is a need to leverage a network of users to enable an owner of a lost tracking device to more efficiently and effectively locate the tracking device.

SUMMARY

A tracking system can coordinate multiple search party members in order to locate a lost tracking device. Upon losing a tracked item, the owner of the lost tracking device can request that the tracking system start a search party to locate the lost item. The tracking server can utilize information provided in this request to establish a set of search party criteria and coordinate a search for the lost item. In some implementations, search party criteria include characteristics of desired search party members, such as a current proximity to the last known location of the lost item. Using these criteria, the tracking system can then select and invite suitable candidates out of the community of users of the tracking system to participate in searching for the lost tracking device.

Candidates who accept the invitation to the search party are added to the search party and can be provided with the last known location of the lost tracking device. Based on this information, the search party members can begin looking for the lost tracking device. When one of the candidate search party members finds the lost tracking device or detects its signal, its location can then be provided back to the tracking system, which can in turn relay this information back to the owner of the lost tracking device. This allows the tracking system to leverage a community of users in locating a lost tracking device.

Figure 1:
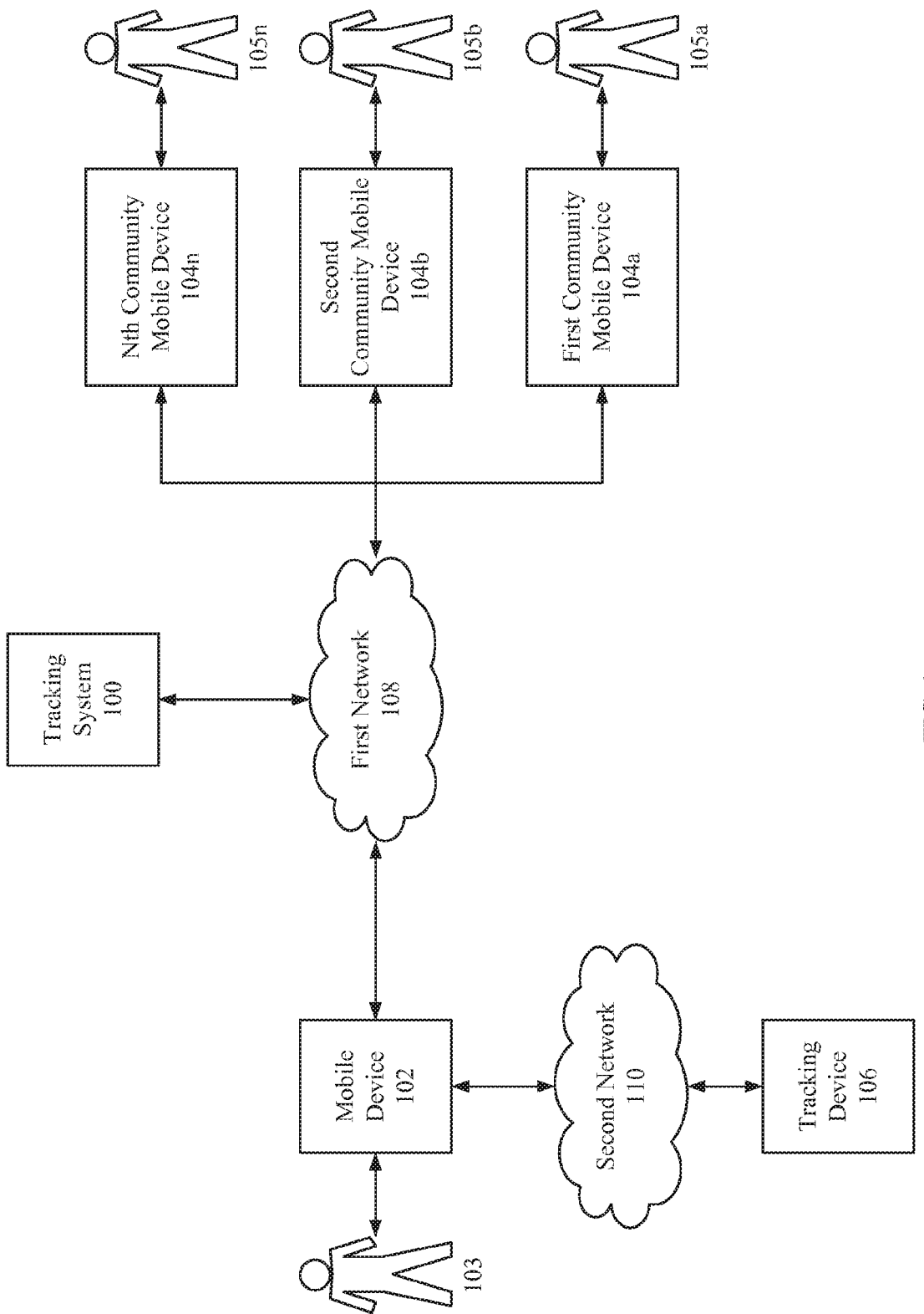
FIG. 1 illustrates an exemplary implementation for locating a tracking device according to principles described herein.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Embodiments described herein provide a user with the ability to locate a lost tracking device by leveraging the capabilities of a plurality of mobile devices associated with a community of users (e.g., users of the same tracking device system) in a secure and privacy-focused environment.

A user can attach a tracking device to or enclose the tracking device within an object, such as a wallet, keys, a car, a bike, a pet, or any other object that the user wants to track. The user can then use a mobile device (e.g., by way of a software application installed on the mobile device) to track the tracking device and corresponding object. For example, the mobile device can perform a local search for a tracking device attached to a near-by object. However, in situations where the user is unable to locate the tracking device using their own mobile device (e.g., if the tracking device is beyond a distance within which the mobile device and the tracking device can communicate), the principles described herein allow the user to leverage the capabilities of a community of users of a tracking device system.

In particular, a tracking system (also referred to herein as a "cloud server" or simply "server") can maintain user profiles associated with a plurality of users of the system. The tracking system can associate each user within the system with one or more tracking devices associated the user (e.g., tracking devices that the user has purchased and is using to track objects owned by the user). If the user's object becomes lost or stolen, the user can send an indication that the tracking device is lost to the tracking system, which is in communication with one or more mobile devices associated with the community of users in communication with the system. The tracking system can set a flag indicating the tracking device is lost. When one of a community of mobile devices that are scanning for nearby tracking devices and providing updated locations to the tracking system identifies a flagged tracking device, the tracking system can associate the received location with the flagged tracking device, and relay the location to a user of the tracking device, thereby enabling the user to locate and track down the tracking device.

In order to aid in locating a lost tracking device, an owner of the lost tracking device can organize a search party of other users within a community of users of the tracking system. The owner of the lost tracking device can invite users within the community of users to join a search party based on one or more criteria. Upon being invited, if a user within the community of users accepts the invitation, the user is added to the search party and can be given the last known location of the lost tracking device. When a mobile device of a member of the search party receives a signal outputted by the lost tracker device (such as a beacon signal), the mobile device of the search party member reports the location of the lost tracking to the tracking system for communication to the owner of the lost tracking device. Search parties further enable an owner of a lost tracking device to provide a reward to a search party member that locates the lost tracking device.

Environment Overview

FIG. 1 illustrates an exemplary implementation in which a tracking system 100 is communicatively coupled to a mobile device 102 associated with the user 103 and a plurality of community mobile devices 104a through 104n (collectively referred to herein as "community mobile devices 104") associated with a plurality of users 105a through 105n of the tracking system 100 (collectively referred to herein as "community users 105"). As will be explained in more detail below, the tracking system 100 can allow the user 103 to manage and/or locate a tracking device 106 associated with the user 103. In some embodiments, the tracking system 100 leverages the capabilities of community mobile devices 104 to locate the tracking device 106 if the location of the tracking device is unknown to the user 103 and beyond the capabilities of mobile device 102 to track. In some configurations, the user 103 may own and register multiple tracking devices 106. Although FIG. 1 illustrates a particular arrangement of the tracking system 100, mobile device 102, community mobile devices 104, and tracking device 106, various additional arrangements are possible.

In some configurations, the user 103 may be part of the community of users 105. Further, one or more users 105 may own and register one or more tracking devices 106. Thus, any one of the users within the community of users 105 can communicate with tracking system 100 and leverage the capabilities of the community of users 105 in addition to the user 103 to locate a tracking device 106 that has been lost.

The tracking system 100, mobile device 102, and plurality of community mobile devices 104 may communicate using any communication platforms and technologies suitable for transporting data and/or communication signals, including known communication technologies, devices, media, and protocols supportive of remote data communications.

In certain embodiments, the tracking system 100, mobile device 102, and community mobile devices 104 may communicate via a network 108, which may include one or more networks, including, but not limited to, wireless networks (e.g., wireless communication networks), mobile telephone networks (e.g., cellular telephone networks), closed communication networks, open communication networks, satellite networks, navigation networks, broadband networks, narrowband networks, the Internet, local area networks, and any other networks capable of carrying data and/or communications signals between the tracking system 100, mobile device 102, and community mobile devices 104. The mobile device 102 and community of mobile devices 104 may also be in communication with a tracking device 106 via a second network 110. The second network 110 may be a similar or different type of network as the first network 108. In some embodiments, the second network 110 comprises a wireless network with a limited communication range, such as a Bluetooth or Bluetooth Low Energy (BLE) wireless network. In some configurations, the second network 110 is a point-to-point network including the tracking device 106 and one or more mobile devices that fall within a proximity of the tracking device 106. Accordingly, the mobile device 102 and community mobile devices 104 are only able to communicate with the tracking device 106 if they are within a close proximity to the tracking device. In some configurations, the mobile device 102 and one or more community mobile devices 104 may each be associated with multiple tracking devices associated with various users.

As mentioned above, FIG. 1 illustrates the mobile device 102 associated with the user 103. The mobile device 102 can be configured to perform one or more functions described herein with respect to locating tracking devices (e.g., tracking device 106). For example, the mobile device 102 can receive input from the user 103 representative of information about the user 103 and information about a tracking device 106. The mobile device 102 may then provide the received user information, tracking device information, and/or information about the mobile device 102 to the tracking system 100. Accordingly, the tracking system 100 is able to associate the mobile device 102, the user 103, and/or the tracking device 106 with one another. In some embodiments, the mobile device 102 can communicate with the tracking device 106 and provide information regarding the location of the tracking device to the user 103. For example, the mobile device 102 can detect a communication signal from the tracking device 106 (e.g., by way of second network 110) as well as a strength of the communication signal to determine an approximate distance between the mobile device 102 and the tracking device 106. The mobile device 102 can then provide this information to the user 103 (e.g., by way of one or more graphical user interfaces) to assist the user 103 to locate the tracking device 106. Accordingly, the user 103 can use the mobile device 102 to track and locate the tracking device 106 and a corresponding object associated with the tracking device 106. If the mobile device 102 is located beyond the immediate range of communication with the tracking device 106 (e.g., beyond the second network 110), the mobile device 102 can be configured to send an indication that a tracking device 106 is lost to the tracking system 100, requesting assistance in finding the tracking device. The mobile device 102 can send an indication of a lost device in response to a command from the user 103. For example, once the user 103 has determined that the tracking device 106 is lost, the user can provide user input to the mobile device 102 (e.g., by way of a graphical user interface), requesting that the mobile device 102 send an indication that the tracking device 106 is lost to the tracking system 100. In some examples, the lost indication can include information identifying the user 103 (e.g., name, username, authentication information), information associated with the mobile device 102 (e.g., a mobile phone number), information associated with the tracking device (e.g., a unique tracking device identifier), or a location of the user (e.g., a GPS location of the mobile device 102 at the time the request is sent).

The tracking system 100 can be configured to provide a number of features and services associated with the tracking and management of a plurality of tracking devices and/or users associated with the tracking devices. For example, the tracking system 100 can manage information and/or user profiles associated with user 103 and community users 105. In particular, the tracking system 100 can manage information associated with the tracking device 106 and/or other tracking devices associated with the user 103 and/or the community users 105.

As mentioned above, the tracking system 100 can receive an indication that the tracking device 106 is lost from the mobile device 102. The tracking system 100 can then process the indication in order to help the user 103 find the tracking device 106. For example, the tracking system 100 can leverage the capabilities of the community mobile devices 104 to help find the tracking device 106. In particular, the tracking system 100 may set a flag for a tracking device 106 to indicate that the tracking device 106 lost and monitor communications received from the community mobile devices 104 indicating the location of one or more tracking devices 106 within proximity of the community mobile devices 104. The tracking system 100 can determine whether a specific location is associated with the lost tracking device 106 and provide any location updates associated with the tracking device 106 to the mobile device 102. In one example, the tracking system may receive constant updates of tracking device 106 locations regardless of whether a tracking device 106 is lost and provide a most recent updated location of the tracking device 106 in response to receiving an indication that the tracking device 106 is lost.

In some configurations, the tracking system 100 can send a location request associated with the tracking device 106 to each of the community mobile devices 104. The location request can include any instructions and/or information necessary for the community mobile devices 106 to find the tracking device 102. For example, the location request can include a unique identifier associated with the tracking device 106 that can be used by the community mobile devices 104 to identify the tracking device 106. Accordingly, if one of the community mobile devices 104 detects a communication from the tracking device 106 (e.g., if the community mobile device 104 is within range or moves within range of the communication capabilities of the tracking device 106 and receives a signal from the tracking device 106 including or associated with the unique identifier associated with the tracking device 106), the community mobile device 104 can inform the tracking system 100. Using the information received from the community mobile devices 104, the tracking system 100 can inform the user (e.g., by way of the mobile device 102) of a potential location of the tracking device 106.

As shown in FIG. 1 and as mentioned above, the tracking system 100 can communicate with a plurality of community mobile devices 104 associated with corresponding community users 105. For example, an implementation may include a first community mobile device 104a associated with a first community user 105a, a second community mobile device 104b associated with a second community user 105b, and additional communication mobile devices associated with additional community users up to an nth community mobile device 104n associated with an nth community user 105n. The community mobile devices 104 may also include functionality that enables each community mobile device 104 to identify a tracking device 106 within a proximity of the community mobile device 104. In one example, a first community mobile device 104a within proximity of a tracking device 106 can communicate with the tracking device 106, identify the tracking device 106 (e.g., using a unique identifier associated with the tracking device 106), and/or detect a location associated with the tracking device 106 (e.g., a location of the first mobile community device 104a at the time of the communication with the tracking device 106). This information can be used to provide updated locations and/or respond to a location request from the tracking system 100 regarding the tracking device 106. In some embodiments, the steps performed by the first community mobile device 104a can be hidden from the first community user 105a. Accordingly, the first community mobile device 104a can assist in locating the tracking device 106 without bother and without the knowledge of the first community user 105a.

As mentioned above, the tracking system 100 can assist a user 103 in locating a tracking device 106. The tracking device may be a chip, tile, tag, or other device for housing circuitry and that may be attached to or enclosed within an object such as a wallet, keys, purse, car, or other object that the user 103 may track. Additionally, the tracking device 106 may include a speaker for emitting a sound and/or a transmitter for broadcasting a beacon. In one configuration, the tracking device 106 may constantly transmit a beacon signal that may be detected using a nearby mobile device 102 and/or community mobile device 104. In some configurations, the tracking device 106 broadcasts a beacon at regular intervals (e.g., one second intervals) that may be detected from a nearby mobile device (e.g., community mobile device 104). The strength of the signal emitted from the tracking device 106 may be used to determine a degree of proximity to the mobile device 102 or community mobile device 104 that detects the signal. For example, a higher strength signal would indicate a close proximity between the tracking device 106 and the mobile device 102 and a lower strength signal would indicate a more remote proximity between the tracking device 106 and the mobile device 102. In some cases, the strength of signal or absence of a signal may be used to indicate that a tracking device 106 is lost.

System Overview

Figure 2:
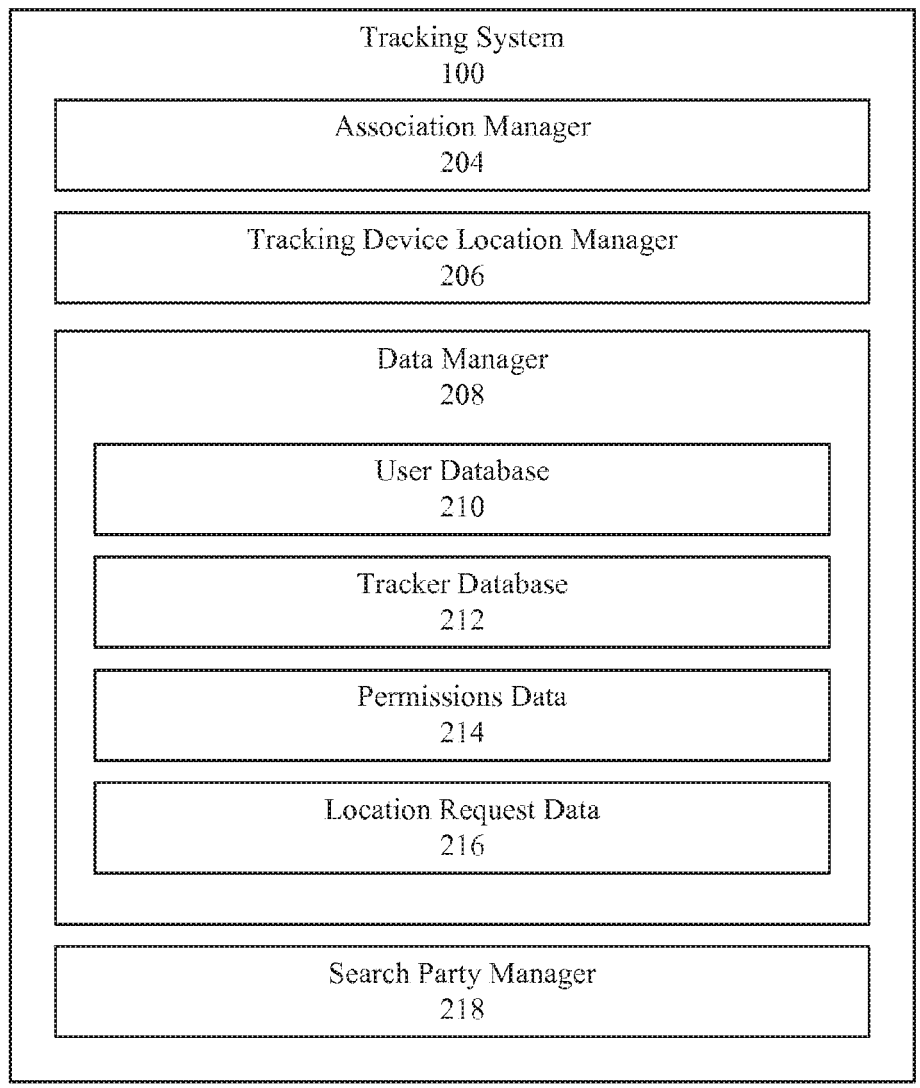
FIG. 2 illustrates an exemplary tracking system of the implementation of FIG. 1.

FIG. 2 illustrates a diagram showing example components of the tracking system 100. As shown, the tracking system 100 may include, but is not limited to, an association manager 204, a tracking device location manager 206, a data manager 208, and a search party manager 218, each of which may be in communication with one another using any suitable communication technologies. It will be recognized that although managers 204-208 are shown to be separate in FIG. 2, any of the managers 204-208 may be combined into fewer managers, such as into a single manager, or divided into more managers as may serve a particular embodiment.

The association manager 204 may be configured to receive, transmit, obtain, and/or update information about a user 103 and/or information about one or more specific tracking devices (e.g., tracking device 106). In some configurations, the association manager 204 may associate information associated with a user 103 with information associated with a tracking device 106. For example, user information and tracking information may be obtained by way of a mobile device 102, and the association manager 204 may be used to link the user information and tracking information. The association between user 103 and tracking device 106 may be used for authentication purposes, or for storing user information, tracking device information, permissions, or other information about a user 103 and/or tracking device 106 in a database.

The tracking system 100 also includes a tracking device location manager 206. The tracking device location manager 206 may receive and process an indication that the tracking device 106 is lost from a mobile device (e.g., mobile device 102 or community mobile devices 104). For example, the tracking system 100 may receive a lost indication from a mobile device 102 indicating that the tracking device 106 is lost. The tracking device location manager 206 may set a flag on a database (e.g., tracker database 212) indicating that the tracking device 106 is lost. The tracking device location manager 206 may also query a database to determine tracking information corresponding to the associated user 103 and/or tracking device 106. The tracking system 100 may obtain tracking device information and provide the tracking device information or other information associated with the tracking device 106 to a plurality of community mobile devices 104 to be on alert for the lost or unavailable tracking device 106. The tracking device location manager 206 may also be used to receive and process a response to a tracking request that is received from one or more community mobile devices 104 that detect the tracking device 106 and respond to the tracking request. For example, the tracking system 100 may receive a response to the tracking request indicating a location within a proximity of the tracking device 106 and provide a last known location within a proximity of the tracking device 106 as provided by the community mobile device 104.

In one configuration, the tracking device location manager 206 may receive an indication that a tracking device 106 is lost from the mobile device 102 and store the lost indication on a database. When the tracking device location manager 206 receives an indication that the tracking device 106 is lost, the tracking device location manager 206 may set a flag indicating that the tracking device 106 is lost. Setting a flag for a tracking device 106 may include storing and/or associating a value associated with the tracking device that indicates that the tracking device 106 is lost. This may include setting a flag, marker, digital value, or other indication that the tracking device 106 is lost and maintaining or storing the indication of the lost tracking device 106 on the tracking system 100 (e.g., on a database).

The tracking device location manager 206 may further receive updated locations from the community of mobile devices 104 that are constantly scanning for nearby tracking devices 106. In this example, the tracking device location manager 206 may receive location updates from the community of mobile devices 104 and, based on the tracking device 106 being indicated as lost, provide a response to a lost indication to the mobile device 102. The response to the lost indication may be a text message, push notification, ring tone, automated voice message, or other response for informing a user 103 that a tracking device 106 has been found and/or an updated location of the tracking device 106.

The tracking device location manager 206 may further manage providing indications about whether a tracking device 106 is lost or not lost. For example, as discussed above, the tracking device location manager 206 may provide a location request to the community of mobile devices 104 indicating that a tracking device 106 is lost. Additionally, upon location of the tracking device 106 by the user 103 or by one of the community of users 105, the tracking device location manager 206 may provide an indication to the user 103, community user 105, or tracking system 100 that the tracking device 106 has been found, thus removing any flags associated with a tracking device and/or canceling any location request previously provided to the community of users 105. For example, where a user 103 sends an indication that the tracking device 106 is lost to the tracking system 100 and later finds the tracking device 106, the mobile device 102 may provide an indication to the tracking system 100 that the tracking device 106 has been found. In response, the tracking device location manager 206 may remove a flag indicating that the tracking device 106 is lost and/or provide an updated indication to the community of users 105 that the tracking device 106 has been found, thus canceling any instructions associated with the previously provided location request. In some configurations, the notification that the tracking device 106 has been found may be provided automatically upon the mobile device 102 detecting a proximity of the tracking device 106. Alternatively, the notification that the tracking device 106 has been found may be provided by the user 103 via user input on the mobile device 102. In another example, a known user (e.g., a friend or family member) with whom the tracking device 106 has been shared may provide an indication that the tracking device 106 has been found.

The tracking system 100 additionally includes a data manager 208. The data manager 208 may store and manage information associated with users, mobile devices, tracking devices, permissions, location requests, and other data that may be stored and/or maintained in a database related to performing location services of tracking devices. As shown, the data manager 208 may include, but is not limited to, a user database 210, a tracker database 212, permissions data 214, and location request data 216. It will be recognized that although databases and data within the data manager 208 are shown to be separate in FIG. 2, any of the user database 210, tracker database 212, permissions data 214, and location request data 216 may be combined in a single database or manager, or divided into more databases or managers as may serve a particular embodiment.

The data manager 208 may include the user database 210. The user database 210 may be used to store data related to various users. For example, the user database 210 may include data about the user 103 as well as data about each user 105 in a community of users 105. The community of users 105 may include any user that has provided user information to the tracking system 100 via a mobile device 102, 104 or other electronic device. The user information may be associated with one or more respective tracking devices 106, or may be stored without an association to a particular tracking device. For example, a community user 105 may provide user information and permit performance of tracking functions on the community mobile device 104 without owning or being associated with a tracking device 106. The user database 210 may also include information about one or more mobile devices or other electronic devices associated with a particular user.

The data manager 208 may also include a tracker database 212. The tracker database 212 may be used to store data related to tracking devices. For example, the tracker database 212 may include tracking data for any tracking device 106 that has been registered with the tracking system 100. Tracking data may include unique tracker identifications (IDs) associated with individual tracking devices 106. Tracker IDs may be associated with a respective user 103. Tracker IDs may also be associated with multiple users. Additionally, the tracker database 212 may include any flags or other indications associated with whether a specific tracking device 106 has been indicated as lost and whether any incoming communications with regard to that tracking device 106 should be processed based on the presence of a flag associated with the tracking device 106.

The data manager 208 may further include permissions data 214 and location request data 216. Permissions data 214 may include levels of permissions associated with a particular user 103 and/or tracking device 106. For example, permissions data 214 may include additional users that have been indicated as sharing a tracking device 106, or who have been given permission to locate a tracking device 106 using an account and/or mobile device 102 associated with the user 103. Location request data 216 may include information related to a location request or a lost indication received from the user 103 via a mobile device 102.

The search party manager 218 coordinates the organization and implementation of search parties to locate lost tracking devices. For example, the search party manager 218 can, in response to a request from an owner of a lost tracking device, invite one or more other users (owners of community mobile devices such as community mobile devices 104 of FIG. 1) to join the search party based on one or more search party criteria. The search party manager 218 can provide, for instance, a last known location of the tracking device and/or any reward information corresponding to the lost tracking device. The search party manager 218, in response to receiving location information corresponding to the lost tracking device from a search party member, can provide the location information to an owner of the lost tracking device, can receive confirmation from the owner of the lost tracking device that the tracking device was retrieved by the owner, and can transfer a reward to the community mobile device that located the lost tracking device. Search party functionality will be described below in greater detail.

Figure 3:
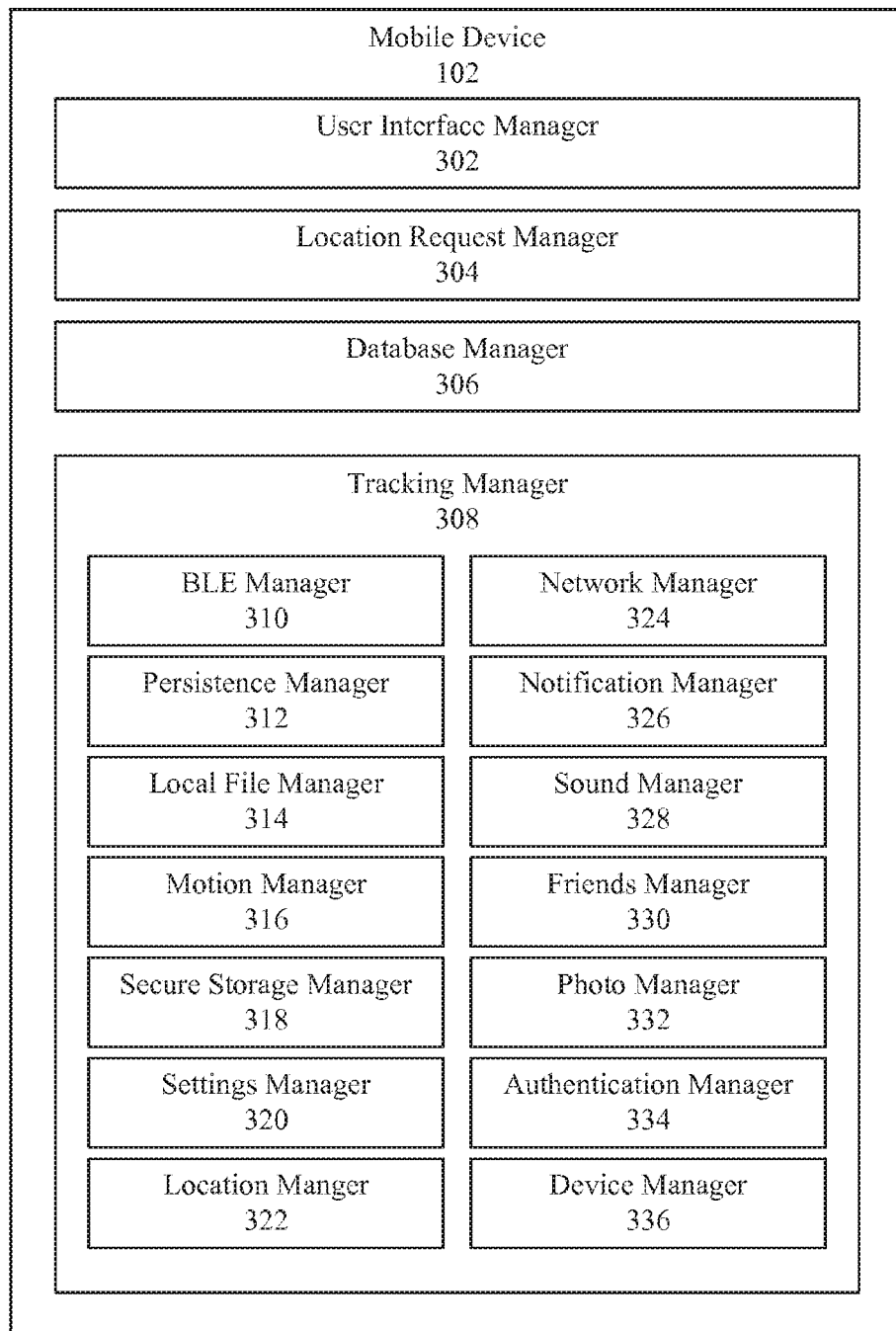
FIG. 3 illustrates an exemplary user mobile device of the implementation of FIG. 1.

FIG. 3 illustrates a diagram showing example components of the mobile device 102. As shown, the mobile device 102 may include, but is not limited to, a user interface manager 302, a location request manager 304, a database manager 306, and a tracking manager 308, each of which may be in communication with one another using any suitable communication technologies. It will be recognized that although managers 302-308 are shown to be separate in FIG. 3, any of the managers 302-308 may be combined into fewer managers, such as into a single manager, or divided into more managers as may serve a particular embodiment.

As will be explained in more detail below, the mobile device 102 includes the user interface manager 302. The user interface manager 302 may facilitate providing the user 103 access to data on a tracking system 100 and/or providing data to the tracking system 100. Further, the user interface manager 302 provides a user interface by which the user 103 may communicate with tracking system 100 and/or tracking device 106 via mobile device 102.

The mobile device 102 may also include a location request manager 304. The location request manager 304 may receive and process a request input to the mobile device 102 to send an indication that a tracking device 106 is lost to a tracking system 100. For example, the user 103 may provide an indication that a tracking device 106 is lost, unreachable, or otherwise unavailable from the mobile device 102 via the user interface manager 302, and the location request manager 304 may process the lost indication and provide any necessary data to the tracking system 100 for processing and relaying a location request to other users 105 over a network 108. In some configurations, an indication that a tracking device 106 is lost is provided via user input. Alternatively, the indication may be transmitted automatically in response to the mobile device 102 determining that a tracking device 106 is lost.

The mobile device 102 may also include a database manager 306. The database manager 306 may maintain data related to the user 103, tracking device 106, permissions, or other data that may be used for locating a tracking device 106 and/or providing a request to a tracking system 100 for locating one or more tracking devices 106 associated with the user 103. Further, the database manager 306 may maintain any information that may be accessed using any other manager on the mobile device 102.

The mobile device 102 may further include a tracking manager 308. The tracking manager 308 may include a tracking application (e.g., a software application) for communicating with and locating a tracking device 106 associated with the user 103. For example, the tracking manager 308 may be one configuration of a tracking application installed on the mobile device 102 that provides the functionality for locating a tracking device 106 and/or requesting location of a tracking device 106 using a plurality of community mobile devices 104. As shown, the tracking manager 308 may include, but is not limited to, a Bluetooth Low Energy (BLE) manager 310, a persistence manager 312, a local files manager 314, a motion manager 316, a secure storage manager 318, a settings manager 320, a location manager 322, a network manager 324, a notification manager 326, a sound manager 328, a friends manager 330, a photo manager 332, an authentication manager 334, and a device manager 336. Thus, the tracking manager 308 may perform any of the functions associated with managers 310-338, described in additional detail below.

The BLE manager 310 may be used to manage communication with one or more tracking devices 106. The persistence manager 312 may be used to store logical schema information that is relevant to the tracking manager 308. The local files manager 314 may be responsible for managing all files that are input or output from the mobile device 102. The motion manager 316 may be responsible for all motion management required by the tracking manager 308. The secure storage manager may be responsible for storage of secure data, including information such as passwords and private data that would be accessed through this sub-system. The settings manager 320 may be responsible for managing settings used by the tracking manager 308. Such settings may be user controlled (e.g., user settings) or defined by the tracking manager 308 for internal use (e.g., application settings) by a mobile device 102 and/or the tracking system 100. The location manager 322 may be responsible for all location tracking done by the tracking manager 308. For example, the location manager 322 may manage access to the location services of the mobile device 102 and works in conjunction with other managers to persist data. The network manager 324 may be responsible for all Internet communications from the tracking manager 308. For example, the network manager 324 may mediate all Internet API calls for the tracking manager 308. The notification manager 326 may be responsible for managing local and push notifications required by the tracking manager 308. The sound manager 328 may be responsible for playback of audio cues by the tracking manager 308. The friends manager 330 may be responsible for managing access to contacts and the user's social graph. The photo manager 332 may be responsible for capturing and managing photos used by the tracking manager 308. The authentication manager 334 may be responsible for handling the authentication (e.g., sign in or login) of users. The authentication manager 334 may also include registration (e.g., sign up) functionality. The authentication manager 334 further coordinates with other managers to achieve registration functionality. The device manager 336 may be responsible for managing the devices discovered by the tracking manager 308. The device manager 336 may further store and/or maintain the logic for algorithms related to device discovery and update.

Figure 4:
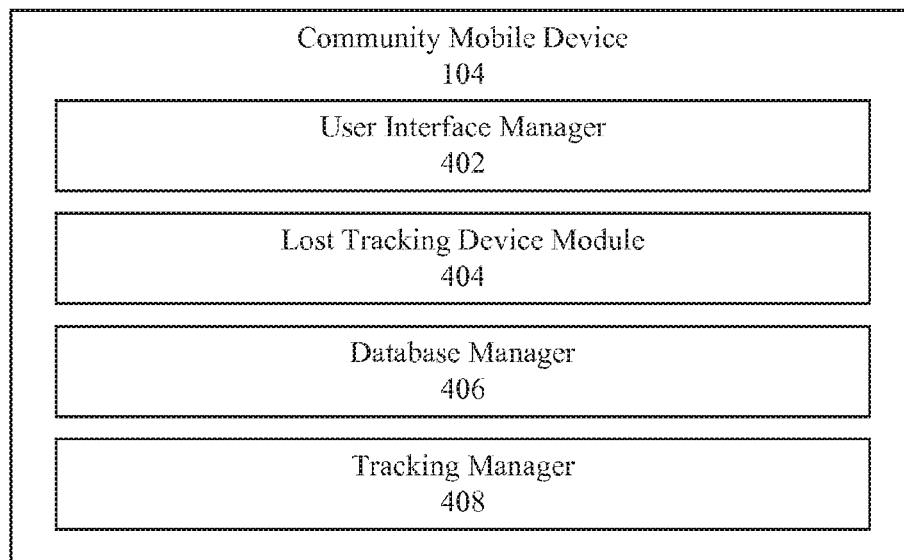
FIG. 4 illustrates an exemplary community mobile device of the implementation of FIG. 1.

FIG. 4 illustrates a diagram showing example components of a community mobile device 104. As shown, the community mobile device 104 may include, but is not limited to, a user interface manager 402, a lost tracking device manager 404, a database manager 406, and a tracking manager 408, each of which may be in communication with one another using any suitable communication technologies. The user interface manager 402, database manager 406, and tracking manager 408 illustrated in FIG. 4 may include similar features and functionality as the user interface manager 302, database manager 306, and tracking manager 308 described above in connection with FIG. 3. It will be recognized that although managers 402-408 are shown to be separate in FIG. 4, any of the managers 402-408 may be combined into fewer managers, such as into a single manager, or divided into more managers as may serve a particular embodiment.

The community mobile device 104 may include a lost tracking device manager 404. The lost tracking device manager 404 may facilitate scanning for nearby tracking devices 106. In some configurations, the lost tracking device manager 404 can continuously or periodically scan (e.g., once per second) for nearby tracking devices 106. The lost tracking device manager 404 may determine whether to provide an updated location of the nearby tracking device 106 to the tracking system 100. In some configurations, the lost tracking device manager 404 provides a location of a nearby tracking device 106 automatically. Alternatively, the lost tracking device manager 404 may determine whether the location of the tracking device 106 has been recently updated, and determine whether to provide an updated location based on the last time a location of the tracking device 106 has been updated (e.g., by the community mobile device 104). For example, where the community mobile device 104 has provided a recent update of the location of a tracking device 106, the lost tracking device manager 404 may decide to wait a predetermined period of time (e.g., 5 minutes) before providing an updated location of the same tracking device 106.

In one configuration, the lost tracking device manager 404 may receive and process a location request or other information relayed to the community mobile device 104 by the tracking system 100. For example, the lost tracking device manager 404 may receive an indication of a tracking device 106 that has been indicated as lost, and provide a location of the tracking device 106 if it comes within proximity of the community mobile device 104. In some configurations, the community mobile device 104 is constantly scanning nearby areas to determine if there is a tracking device 106 within a proximity of the community mobile device 104. Therefore, where a tracking device 106 that matches information provided by the tracking system 100 (e.g., from the location request) comes within proximity of the community mobile device 104, the lost tracking device manager 404 may generate and transmit a response to the location request to the tracking system 100, which may be provided to the user 103 associated with the lost tracking device 106. Further, generating and transmitting the response to the tracking request may be conditioned on the status of the tracking device 106 being flagged as lost by the mobile device 102 and/or the tracking system 100.

The lost tracking device manager 404 may additionally provide other information to the tracking system 100 in response to receiving the tracking request. For example, in addition to providing a location of the community mobile device 104, the lost tracking device manager may provide a signal strength associated with the location to indicate a level of proximity to the location of the community mobile device 104 provided to the user 103. For example, if a signal strength is high, the location provided to the user 103 is likely to be more accurate than a location accompanied by a low signal strength. This may provide additional information that the user 103 may find useful in determining the precise location of tracking device 106.

As described above, the lost tracking device manager 404 may determine whether to send a location within the proximity of the tracking device 106 to the tracking system 100. The determination of whether to send a location to the tracking system 100 may be based on a variety of factors. For example, a lost tracking device manager 404 may determine to send a location of the tracking device 106 to a tracking system 100 based on whether the detected tracking device 106 has been indicated as lost or if a tracking request has been provided to the community mobile device 104 for the particular tracking device 106. In some configurations, the community mobile device 104 may send an update of a location of a tracking device 106 even if the tracking device 106 is not associated with a current tracking request or if the tracking device 106 is not indicated as lost. For example, where the location of a tracking device 106 has not been updated for a predetermined period of time, the community mobile device 104 may provide an update of a tracking device location to the tracking system 100, regardless of whether a tracking request has been received.

In some configurations, the community mobile device 104 may include additional features. For example, the community mobile device 104 may allow a tracking system 100 to snap and download a photo using photo functionality of the community mobile device 104. In some configurations, this may be an opt-in feature by which a community user 105 permits a tracking system 100 to take a snap-shot and possibly provide a visual image of an area within a proximity of the tracking device 106.

Search Party Management

In some embodiments, the tracking system 100 enables the use of a network of community mobile devices to locate a lost tracking device in response to a request from an owner of the lost tracking device, for instance, via the search party manager 218. In such embodiments, the owner of the lost tracking device can request the formation of a search party to locate the lost tracking device, and the search party manager 218 invites one or more of the network of community mobile devices to join the search party. As used herein, community mobile devices that have accepted an invitation to locate a lost tracking device in response to a request from the owner of the lost tracking device are referred to as a "search party". Community mobile devices can be invited to join a search party based on one or more criteria. In some implementations, a reward for locating the lost tracking device may be offered by the owner of the lost tracking device.

A search party, after its creation by the search party manager 218, may be populated by inviting community mobile devices 104 to participate based on certain criteria, hereafter "search party criteria." In some embodiments, invited community mobile devices become members of the search party after acceptance of the invitation. In some configurations, invited community mobile devices may become search party members without having to accept the invitation. Search party manager 218 may monitor membership in the search party and can expand the search party criteria based on target membership goals or other metrics associated with the management of the search party.

In response to accepting an inviting to join a search party, members of the search party are given additional information about the lost tracking device. For example, members of the search party may be given the last known location of the lost tracking device. Likewise, search party members may be given information about a reward offered in association with the search party.

In some configurations, the search party is implemented by search party manager 218 until the lost tracking device is found, until the owner of the lost tracking device cancels the search party, or until the occurrence of one or more conditions corresponding to the canceling of the search party (such as the passage of a threshold amount of time). Before the search party is canceled, the owner of the lost tracking device may be notified by search party manager 218. For example, if the lost device was located, the owner of the lost tracking device may be notified of its location by search party manager 218, and if a threshold amount of time has passed without the device being located, the owner can be notified that the search party was expired.

In some configurations, the owner of a lost tracking device sends a search party request via their associated mobile device or any other suitable interface to the search party manager 218. The request may contain any relevant information associated with the search party request, for example reward information, requested search party criteria (such as a desired duration of the search party, a desired size of the search party, the last known location of the lost tracking device, another location associated with the tracking device, a reputation of candidate search party members, a proximity to last known location of candidate search party members, a relationship type or strength between candidate search party members and the owner of the lost tracking device, and the like) or any other information associated with the lost tracking device that might be useful in locating the lost tracking device (such as a photograph of the lost tracking device, properties of the lost tracking device, and the like).

In response to receiving a search party request, the search party manager 218 implements a search party. In some embodiments, the search party manager 218 implements a search party based on requested search party criteria included within the search party request, such as a requested size of a search party and a threshold reputation of search party members. The search party manager 218 then invites candidate search party members based on the requested search party criteria. In some embodiments, if a search party is requested with invalid or infeasible search party criteria, the search party manager 218 can expand or alter the requested search party criteria before implementing the search party. For instance, if the search party request requests users above a threshold reputation for inclusion within a search party, and no users with an above threshold reputation are within a threshold distance of the lost tracking device's last known location, the search party manager 218 can implement the search party without the threshold reputation requirement. As used herein, community mobile devices that satisfy any search party criteria and that are eligible for invitation to the search party are referred to as "candidate search party members." In some embodiments, candidate search party members are selected from owners of community mobile devices that configure their devices or tracking system accounts to participate in search parties.

In some embodiments, the search party manager 218 implements a search party based on default search party criteria. For instance, the search party manager 218 may implement a search party with a pre-determined target number of search party members, such as 10 users. In such embodiments, the search party manager 218 can invite candidate search party members to join the search party, and in response to the number of invited candidate search party members that accept the invitation, can alter the default search party criteria to expand the number of search party members. For instance, if the search party manager 218 invites 20 candidate search party members within a first threshold distance of the last known location of the lost tracking device with a goal of having 10 candidate members join the search party, and only 6 candidate members end up joining the search party, the search party manager can identify additional candidate search party members by, for example, expanding the first threshold distance to a second, larger threshold distance of the last known location.

Figure 5:
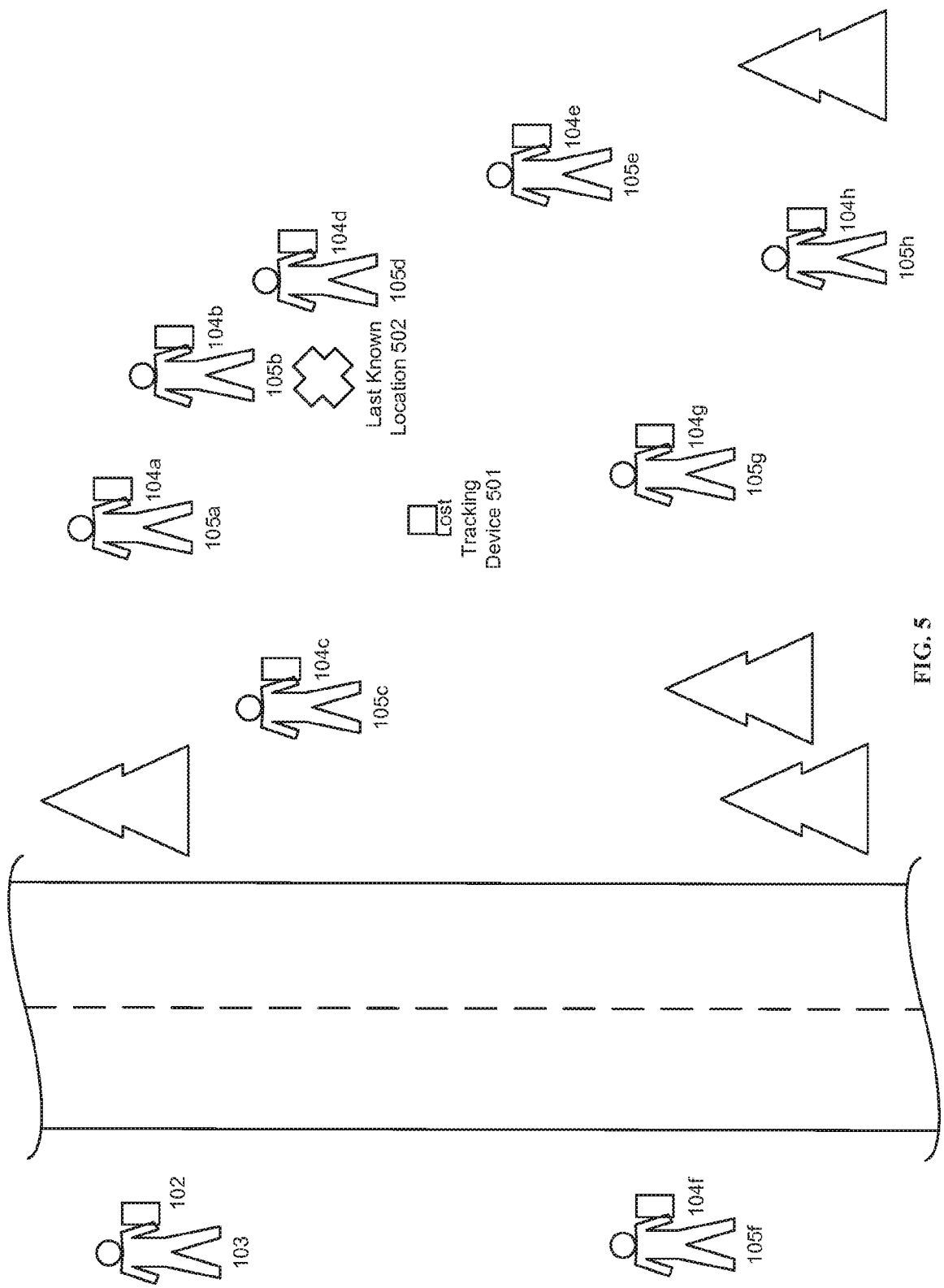
FIG. 5 illustrates an environment for locating a tracking device, according to one embodiment.

As noted above, candidate search party members can be selected based on the proximity of the candidate search party member to a last known location of the tracking device. FIG. 5 illustrates an environment for locating a tracking device, according to one embodiment. FIG. 5 shows an owner 103 and an owner mobile device 102 associated with a lost tracking device 501. Candidate search party members 104a-104f are located around the last known location 502 of the lost tracking device 501. In the embodiment of FIG. 5, search party members are identified based on a proximity to the last known location 502 of the lost tracking device. In this embodiment, users 105a, 105b, and 105d are within a first threshold distance of the last known location 502 and are invited to join the search party. In response to determining to invite additional candidate search party members (for instance, in response to a less than requested threshold number of candidate search party members joining the search party), the first threshold distance can be expanded to a greater, second threshold distance from the last known location 502, within which users 105c, 105e, and 105g reside. In this embodiment, users 105f and 105h is outside of both the first threshold distance and the second threshold distance from the last known location 502, and is not invited to join the search party.

Candidate search party members can be selected based on historical location data associated with the candidate search party member. For example, in the embodiment of FIG. 5, user 105f is far from the last known location 502 of the lost tracking device 501. However, if the candidate search party member 104f is associated with historical location data showing past proximity within a threshold distance of the last known location 502, candidate search party member 104f may be invited to the search party based on this factor. For instance, if the candidate search party member 104f passes close by the last known location 502 on the way home from work between 6 pm and 7 pm every day, the candidate search party member 104f may be invited to join the search party. In some embodiments, candidate search party members can be selected based on historical location data and time data, and based on current time data. Continuing with the previous example, candidate search party member 104f can be invited to join the search party if the current time is 6:30 pm (or within a threshold amount of time of the 6:00 pm to 7:00 pm interval highlighted above), and can avoided to join the search party if the current time is 9:00 am.

In another embodiment, candidate search party members are selected based on previous participation in search parties. For example, candidate search party members may be assigned a reputation based on past participation in successful search parties. A candidate search party member's reputation may be increased in response to successfully finding the lost mobile device in a previous search party. In some embodiments, candidate search party members may be selected by comparing their reputation score against a reputation threshold included within the search party criteria. In the embodiment of FIG. 5, users 105c, 105d, and 105f may have reputation exceeding a threshold reputation, and may be invited to the search party accordingly. It should be noted that a candidate search party member's reputation can also be decreased, for instance in response to bad behavior reported by other search party members or users of the tracking system 100, in response to participating in a threshold number of search parties without successfully locating a lost tracking device, or based on any other suitable criteria.

Candidate search party members may be selected based on a connection to or relationship with the owner 103 of the lost tracking device 501. The system 100 can store connections or relationships between users of the tracking system 100 internally. Alternatively, connections or relationships between users can be obtained from an outside source. For example, the search party manager 218 may interface with a social networking system and access connections between users from a social graph of the social networking system. Candidate search party members with an established relationship (such as "friends" within the social networking system) with the owner 103 of the lost tracking device 501 can be invited to join the search party.

In another embodiment, candidate search party members can be directly invited by the owner of the lost tracking device. For example, the search party manager 218 may provide the owner 103 a link or URL which the owner 103 can provide to candidate search party members, for instance via text messaging, email, social media, and the like. Candidate search party members who click the provided link are then added to the search party, according to one embodiment. In other embodiments, the owner 103 can invite candidate search party members directly from the mobile device 102 or from an application associated with the tracking system 100. In the embodiment of FIG. 5, user 105c may be directly sent an invite by the owner 103, and, in response to a selection of a link within the invite, may be added to the search party.

In another configuration, candidate search party members 104 may request to join a search party. In some embodiments, community mobile devices 104 may present an interface that allows community users 105 to view active nearby search parties. In such embodiments, a community user 105 may then request an invite to a search party. For example, in FIG. 5, the candidate search party member 105g may request an invite to a search party to locate the lost tracking device 501 through an interface presented by the community mobile device 104g. Upon receiving this request, the search party manager 218 may add the candidate search party member 105g to the search party, for instance if the candidate search party member satisfies any search party criteria corresponding to the search party.

As noted above, in some embodiments, search party criteria are not static over the lifetime of the search party. The search party manager 218 can modify the search party criteria, for instance based on one or more search goals (such as a number of search party members, the passage of an interval of time without a lost tracking device being located, and the like). For example, if less than a threshold number of search party members have accepted invitations to join a search party, search party criteria can be expanded or eliminated, for instance by increasing a requisite threshold proximity to the last known location of a lost tracking device 501.

Search party criteria may also be modified by search party manager 218 based on any number of additional factors. In some configurations, an owner of a lost tracking device can adjust the search party criteria after making the initial search party request, for instance using the mobile device corresponding to the lost tracking device or using any other tracking system interface. In some embodiments, the search party manager 218 adjusts the search party criteria based on outside factors such as time of day or weather conditions. It should be noted that although several search party criteria are described herein individually, in practice, candidate search party members can be identified and invited to join a search party based on any combination of search party criteria as well.

Figure 6:
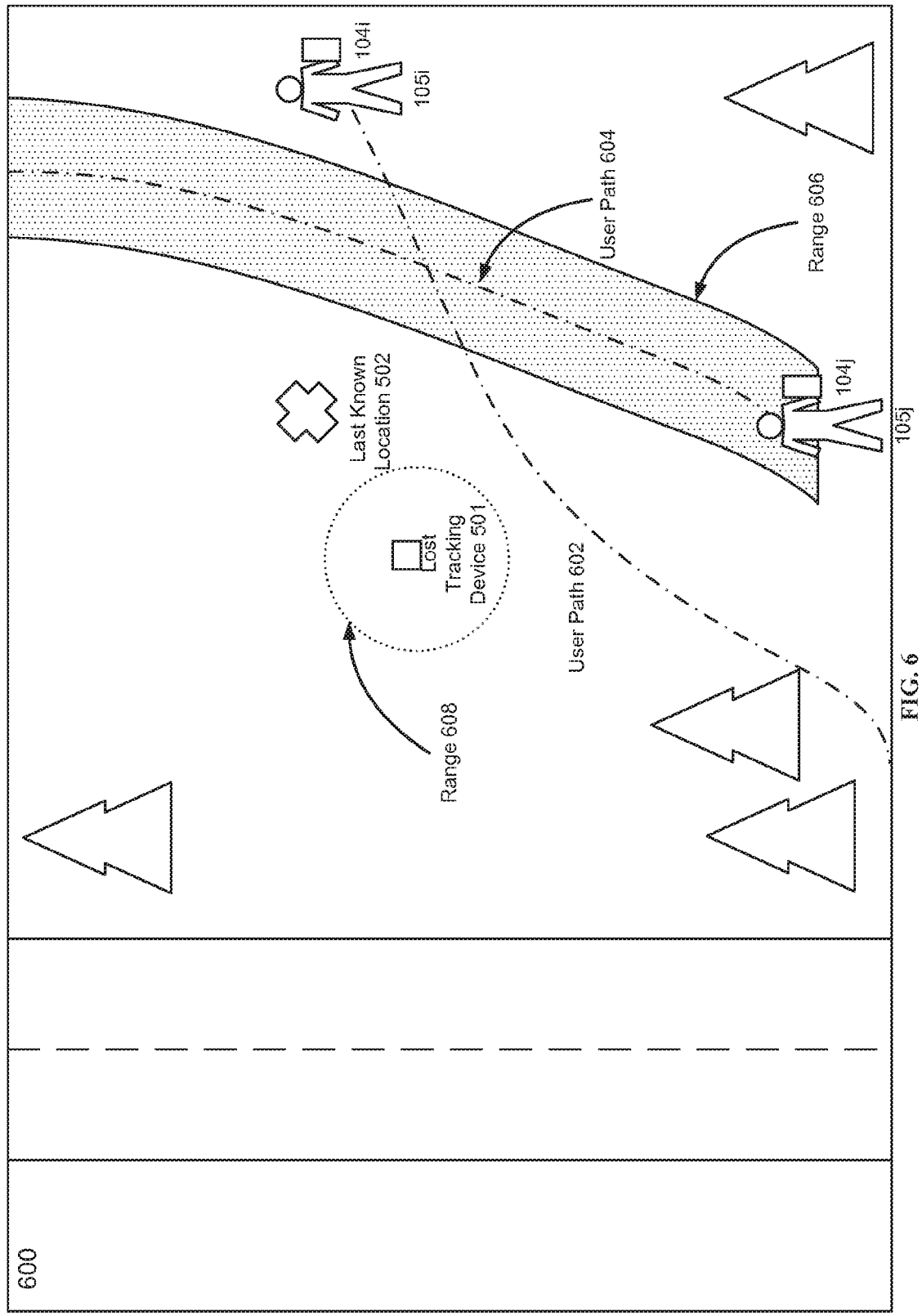
FIG. 6 illustrates an interface for use in locating a tracking device, according to one embodiment.

In some configurations, candidate search party members are provided with data on the progress or performance of the search party FIG. 6 illustrates an interface for use in locating a tracking device, according to one embodiment. In the embodiment of FIG. 6, a map 600 is generated by search party manager 218 and displayed to search party members to increase the efficiency of search party members in searching for lost tracking device 501. User paths 602 and 604 trace the paths of search party members 105i and 105j. Displaying this information to search party members enables the users to avoid overlapping or searching locations that have already been searched by another search party member.

In some embodiments, an approximate search range of a community mobile device 104 can be displayed in conjunction with a path taken by a search party member. For example, user path 604 has a range 606 representing an outer limit of the communicative range of the community mobile device 104j. In such embodiments, if the lost tracking device 501 is located closer to the user path 604 than the range 606, the community mobile device 104j will locate the lost tracking device. For example, in the embodiment of FIG. 6, range 608 represents the communicative range of the lost tracking device 501. Accordingly, the map area defined by locations within the range 606 on either side of the user path 604 represents locations already searched by the search party member 105j. By displaying such areas, other search party members can expedite their search for the lost tracking device 501 by avoiding such areas. The user path 604 and the area within the range 606 can be colored, graduated, or otherwise modified within the map 600, and can display other relevant information such as estimated signal strength of the community mobile device 104j, the time since search was performed by the community mobile device 104j, the identity of the search party member 105j, or any other information. This information may additionally be used by search party manager 218 to calculate various search party metrics, for example the percentage of searched area within a target area centered on last known location 502. This additional data may then be displayed on search party member devices, displayed to candidate search party members, accessible by the owner of the lost tracking device 501, or used in any other suitable manner.

Figure 7:
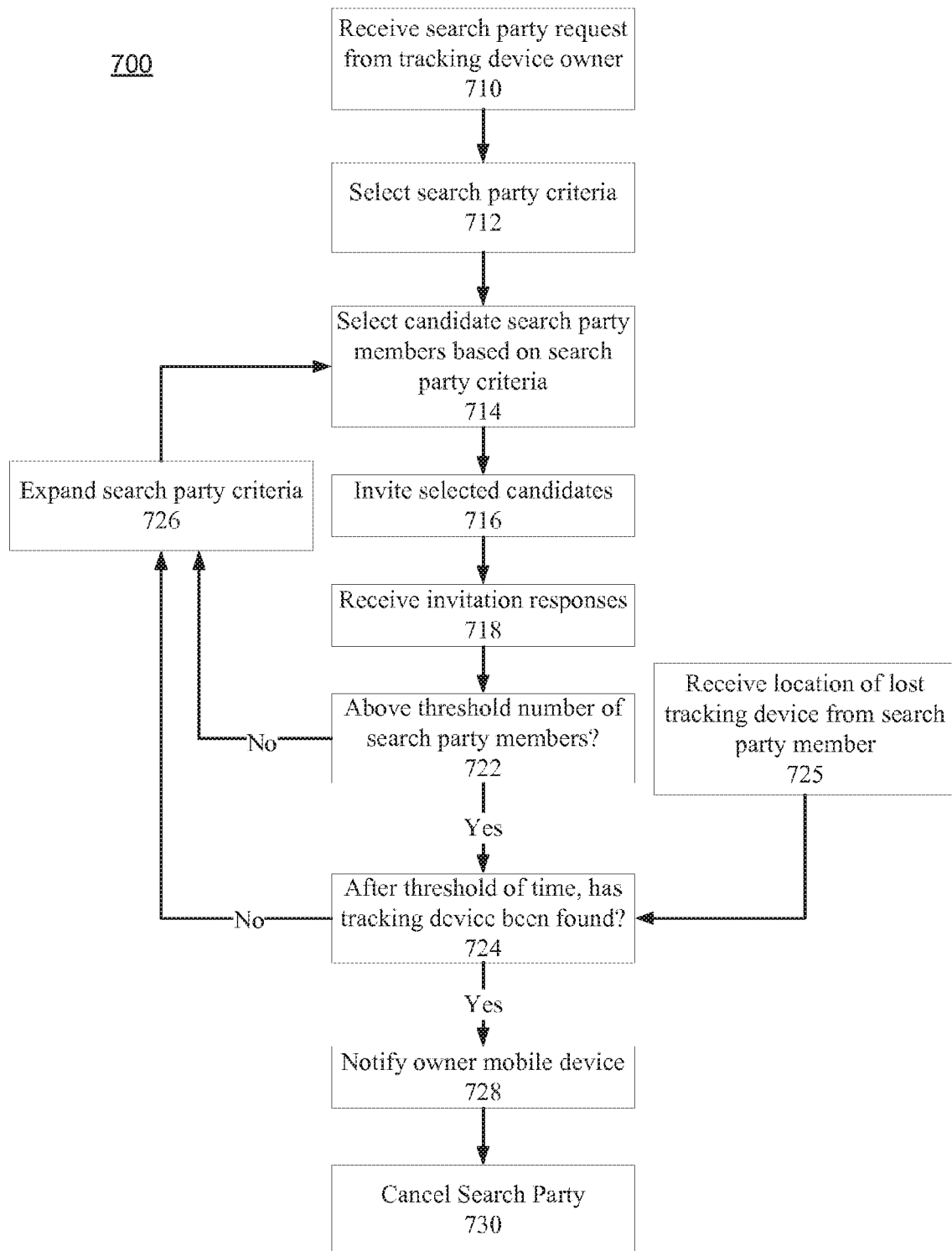
FIG. 7 is a flowchart illustrating a process for locating a tracking device, accordingly to one embodiment.

FIG. 7 is a flowchart illustrating a process for locating a tracking device, accordingly to one embodiment. According to the embodiment of FIG. 7, a tracking system receives 710 a search party request from an owner of a lost tracking device. The request can include search party criteria, an identity of the lost tracking device, an identity of the owner, or any other suitable information. The tracking system selects 712 search party criteria in response to and based on the received search party request. For instance, the search party criteria can include a proximity to a last known location of the lost tracking device, a target number of search party members, and a reputation of candidate search party members. Candidate search party members are selected 714 based on the selected search party criteria, and selected candidate search party members are invited 716 to join the search party.

Responses to the invitations are received 718 from candidate search party members. The number of acceptances to join the search party is compared 722 to a target number of search party members. In response to the number of acceptances being below the target number of search party members, the search party criteria are expanded 726 and more candidate search party members are selected and invited to join the search party based on the expanded criteria.

After a threshold interval of time, the search party manager 218 checks 724 to see if the lost tracking device has been located. For example, the tracking system may receive 725 a location of the lost tracking device from a search party member. If the lost tracking device 501 has not yet been located within the threshold interval of time, the search party criteria can be expanded 726, and additional candidate search party members can be selected and invited to join the search party based on the expanded criteria. If during the interval of time, a location of the lost tracking device is received by search party manager 218, the tracking device is marked within the tracking system as found, and the tracking system notifies 728 the owner of the lost tracking device and cancels 730 the search party.

In some embodiments, for example when the search party is no longer deemed effective, when the number of search party members falls below a threshold, after the passage of a pre-determined interval of time, or the like, a search party may be canceled without the lost tracking device being located. In another embodiment, an owner of the lost tracking device may cancel a search party by sending a request to search party manager 218.

As noted previously, an owner of a lost tracking device may post a reward for finding the lost tracking device. In some embodiments, the reward may be awarded to one search party member or any number of search party members that locate the lost tracking device, and may be a monetary reward, a discount or coupon, a product, a service, an achievement, a reputation increase, or any other suitable reward. The reward can be included within the search party request from the owner of the lost tracking device. For instance, when requesting a search party, the owner of the lost tracking device can transfer a monetary award from an account of the owner to the search party manager 218 for holding until the lost tracking device is located.

Upon finding the lost tracking device, a search party member can claim the reward. The search party manager 218, in response, can ask the owner of the lost tracking device to verify that the lost tracking device has been found. Such verification can occur manually (for instance, the search party manager 218 can provide the location of the lost tracking device to the owner of the lost tracking device, who then notifies the search party manager 218 that the lost tracking device has been found), or automatically (for instance, the mobile device of the owner can communicatively detect the lost tracking device, and can notify the search party manager 218 that the lost tracking device has been found). When the owner of the lost tracking device verifies that the lost tracking device has been found, the search party manager 218 can release the reward held by the tracking system to an account of the search party member that found the lost tracking device.

Figure 8:
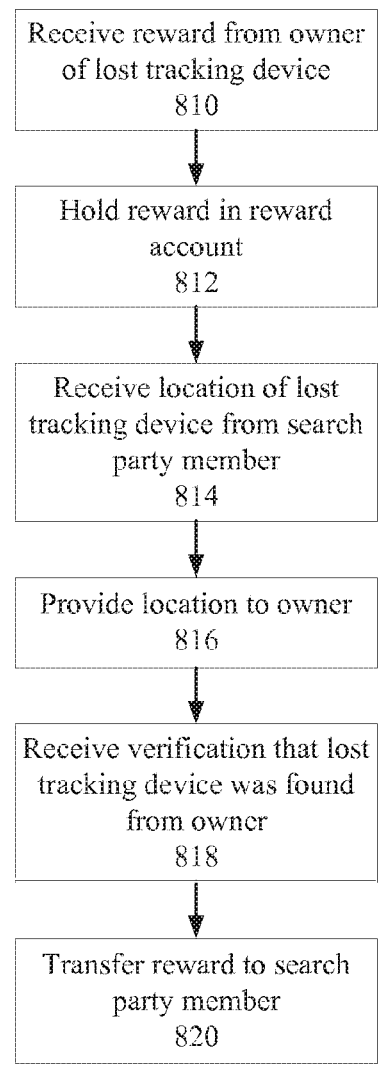
FIG. 8 is a flowchart illustrating a process for compensating a person for locating a tracking device, according to one embodiment.

FIG. 8 is a flowchart illustrating a process for compensating a person for locating a tracking device, according to one embodiment. In the embodiment of FIG. 8, the reward is received 810 from an owner of the lost tracking device, for instance in conjunction with a search party request, where it is held 812 until claimed. A location of the lost tracking device is received 814 from a search party member, and the location of the lost tracking device is provided 816 to the owner of the lost tracking device. Verification that the lost tracking device has been found is received 818 from the owner, and the reward is transferred 820 to the search party member that found the lost tracking device.

In some embodiments, a search party may end without the lost tracking device being found, or the owner of the lost tracking device or a community user not included within the search party may find the lost tracking device. In such embodiments, the reward is returned to the owner of the lost tracking device.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Any of the devices or systems described herein can be implemented by one or more computing devices. A computing device can include a processor, a memory, a storage device, an I/O interface, and a communication interface, which may be communicatively coupled by way of communication infrastructure. Additional or alternative components may be used in other embodiments. In particular embodiments, a processor includes hardware for executing computer program instructions by retrieving the instructions from an internal register, an internal cache, or other memory or storage device, and decoding and executing them. The memory can be used for storing data or instructions for execution by the processor. The memory can be any suitable storage mechanism, such as RAM, ROM, flash memory, solid state memory, and the like. The storage device can store data or computer instructions, and can include a hard disk drive, flash memory, an optical disc, or any other suitable storage device. The I/O interface allows a user to interact with the computing device, and can include a mouse, keypad, keyboard, touch screen interface, and the like. The communication interface can include hardware, software, or a combination of both, and can provide one or more interfaces for communication with other devices or entities.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for locating a lost tracking device, comprising:
   identifying, by a tracking server, a set of users each associated with a device, the set of users located within a geographic area;
   determining, by the tracking server, based on location information received from each of the devices, a portion of the geographic area corresponding to paths traveled by the devices; and
   modifying, by the tracking server, a map interface displayed by a client device communicatively coupled to the tracking server and representative of the geographic area to show 1) the paths traveled by the devices, and 2) portions of the geographic area around the paths traveled by the devices within a communicative range of the devices.

2. The method of claim 1, further comprising modifying the map interface to identify portions of the geographic area not within a communicative range of the devices as the devices move through the geographic area.

3. The method of claim 1, wherein the map interface further comprises an indication of the last known location of the lost tracking device.

4. The method of claim 1, wherein the set of users are invited to join a search party by the tracking server.

5. The method of claim 1, wherein the set of users are selected by the tracking server in response to satisfying one or more criteria.

6. The method of claim 1, wherein the client device is not a device of the set of users.

7. The method of claim 1, wherein the client device is associated with an owner of the lost tracking device.

8. A system, comprising:
   a non-transitory computer-readable storage medium storing executable computer instructions that, when executed, cause the system to perform steps comprising:
      identifying, by a tracking server, a set of users each associated with a device, the set of users located within a geographic area;
      determining, by the tracking server, based on location information received from each of the devices, a portion of the geographic area corresponding to paths traveled by the devices; and
      modifying, by the tracking server, a map interface displayed by a client device communicatively coupled to the tracking server and representative of the geographic area to show 1) the paths traveled by the devices, and 2) portions of the geographic area around the paths traveled by the devices within a communicative range of the devices; and
   a hardware processor configured to execute the instructions.

9. The system of claim 8, further comprising modifying the map interface to identify portions of the geographic area not within a communicative range of the devices as the devices move through the geographic area.

10. The system of claim 8, wherein the map interface further comprises an indication of the last known location of the lost tracking device.

11. The system of claim 8, wherein the set of users are invited to join a search party by the tracking server.

12. The system of claim 8, wherein the set of users are selected by the tracking server in response to satisfying one or more criteria.

13. The system of claim 8, wherein the client device is not a device of the set of users.

14. The system of claim 8, wherein the client device is associated with an owner of the lost tracking device.

15. A non-transitory computer-readable storage medium storing executable computer instructions that, when executed by a hardware processor, cause the hardware processor to perform steps comprising:
   identifying, by a tracking server, a set of users each associated with a device, the set of users located within a geographic area;
   determining, by the tracking server, based on location information received from each of the devices, a portion of the geographic area corresponding to paths traveled by the devices; and
   modifying, by the tracking server, a map interface displayed by a client device communicatively coupled to the tracking server and representative of the geographic area to show 1) the paths traveled by the devices, and 2) portions of the geographic area around the paths traveled by the devices within a communicative range of the devices.

16. The non-transitory computer-readable storage medium of claim 15, further comprising modifying the map interface to identify portions of the geographic area not within a communicative range of the devices as the devices move through the geographic area.

17. The non-transitory computer-readable storage medium of claim 15, wherein the map interface further comprises an indication of the last known location of the lost tracking device.

18. The non-transitory computer-readable storage medium of claim 15, wherein the set of users are invited to join a search party by the tracking server.

19. The non-transitory computer-readable storage medium of claim 15, wherein the set of users are selected by the tracking server in response to satisfying one or more criteria.

20. The non-transitory computer-readable storage medium of claim 15, wherein the client device is not a device of the set of users.

* * * * *